United States Patent Office 2,767,095
Patented Oct. 16, 1956

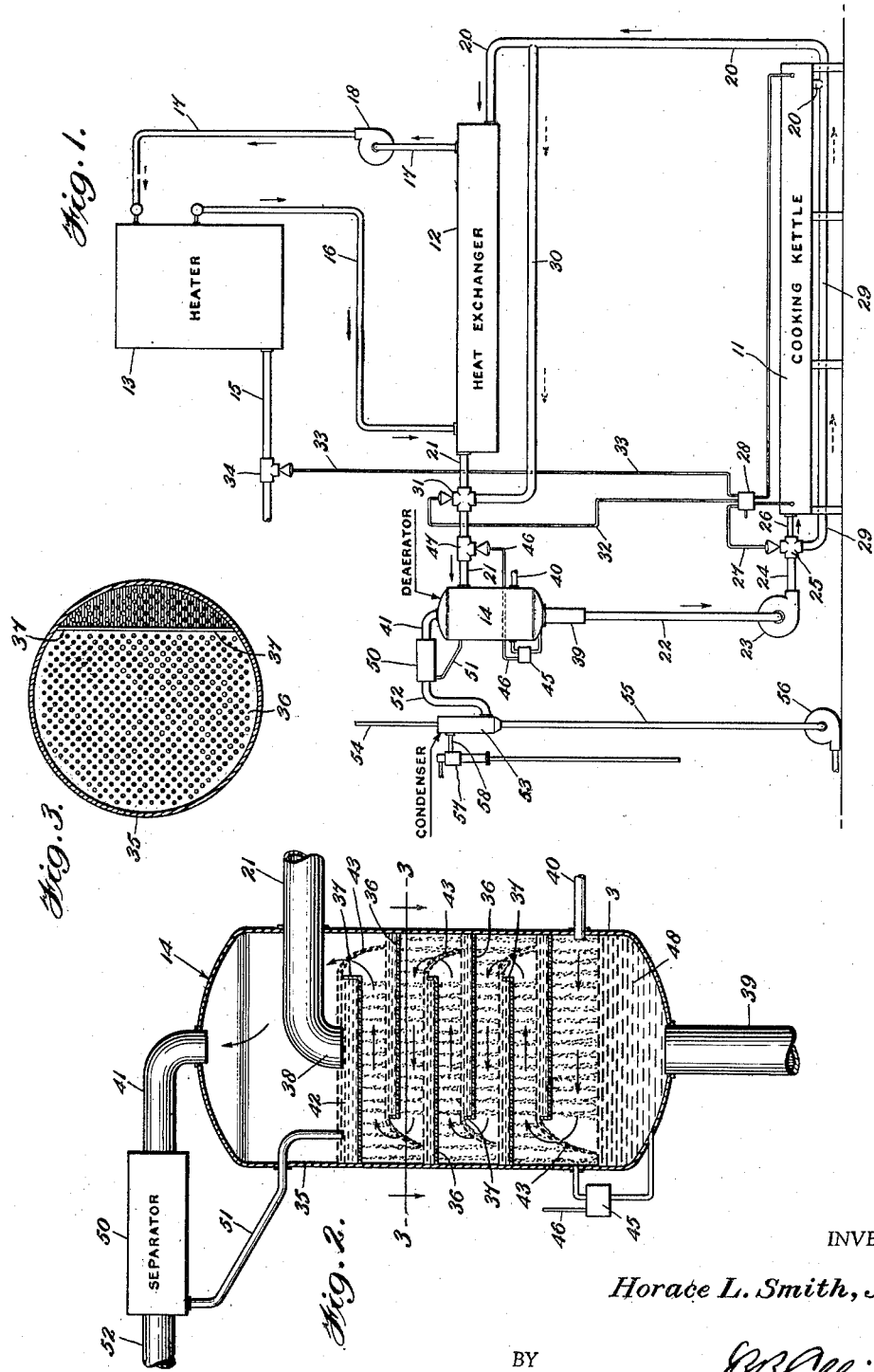

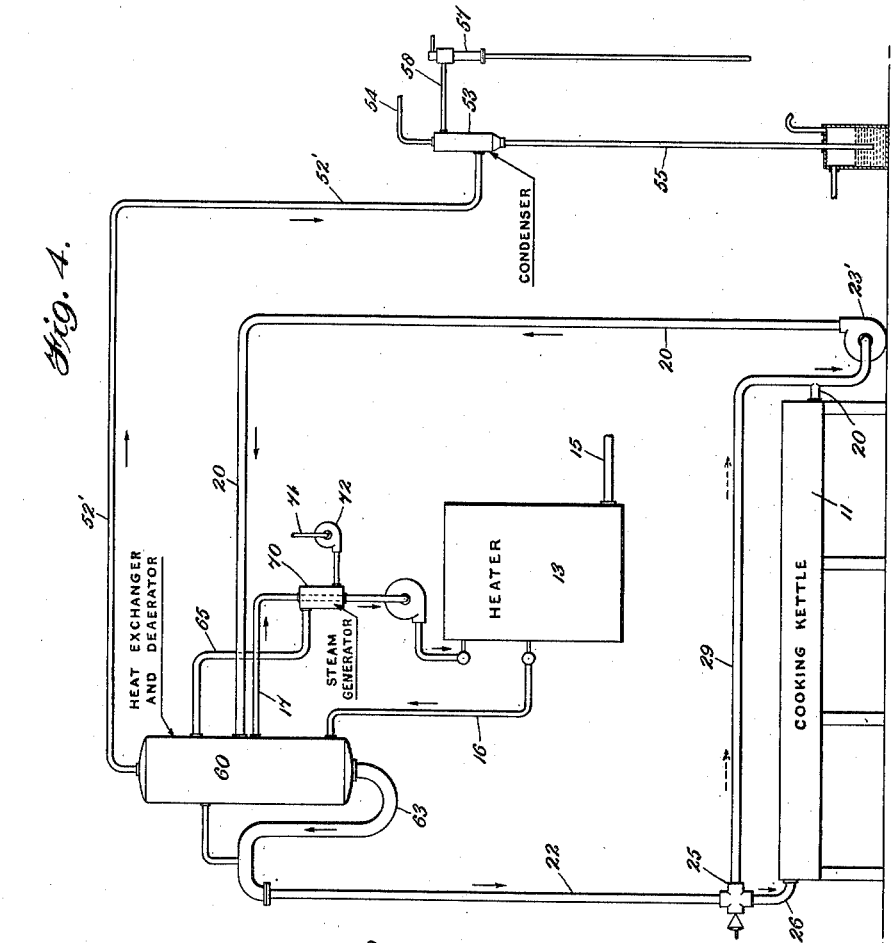

2,767,095

METHOD OF COOKING COMESTIBLES

Horace L. Smith, Jr., Richmond, Va., assignor to H. W. Lay & Company, Inc., Atlanta, Ga., a corporation of Tennessee Application February 6, 1953, Serial No. 335,462

9 Claims. (Cl. 99—100)

The invention relates to the cooking of comestibles and has for its principal object the provision of an improved method of and apparatus for preparing food products of the "deep-fat" cooked type. While susceptible of use in the commercial production of various kinds of deep fat cooked foods, it is of particular advantage in connection with products which are packaged, distributed and sold for consumption considerably subsequent to preparation; and since potato chips provide a typical example of such products, the invention will be herein described in connection therewith. However, as will be readily recognized by those skilled in the art, the principles involved may be utilized equally as well in producing doughnuts, French fried potatoes and other deep fat cooked comestibles.

In the commercial production of potato chips the raw potato slices usually are continuously introduced into, traversed through, and removed from a body of liquid cooking medium contained in an elongated open-top tank or kettle, which medium is maintained at cooking temperatures by appropriate heating means associated with the kettle. The cooking medium most commonly employed is a vegetable oil, such as cotton-seed oil, corn oil and the like, and since such oils begin to break down at temperatures in excess of 450° F., the temperature of the body of oil in the kettle usually is maintained within the range of from 300° F. to 400° F.

The solubility of air in the cooking medium is a function of the temperature of the medium, and since it is in direct contact with the atmosphere in the open-top cooking kettle, and perhaps elsewhere in the system, at the cooking temperatures above indicated relatively large quantities of air are normally taken up by the oil. While the nitrogen in such air, being substantially inert, does not harmfully affect either the oil or the product, the oxygen thereof has a highly deleterious effect upon the oil, causing breakdown and relatively rapid deterioration thereof, with consequent reduction of its useful life as a cooking medium. Furthermore, even though the chips are drained upon their removal from the cooking kettle, they nevertheless carry substantial amounts of the oil when packaged and the greater the quantity of oxygen present in such oil, the quicker will it become rancid and thus shorten the shelf life of the product.

In a more specific aspect, the invention provides a method of and apparatus for cooking comestibles in deep fat whereby the above-mentioned objectionable results flowing from the dissolution of air in the cooking medium will be materially reduced or substantially completely overcome. Essentially, this is accomplished by substantially continuously withdrawing oil from the cooking kettle; heating it to cooking temperatures outside the kettle; subjecting it to a deaerating action either serially or concurrently with such heating; and continuously returning the oil to the kettle in such heated and deaerated condition. While such oil of course again dissolves air while in the cooking kettle, the dissolved-oxygen content of the body of oil therein is at all times far below that of such body under the prior procedure, and as a result not only is the life of the oil as a cooking medium measurably prolonged but also the shelf life of the product is substantially lengthened. Removal of the dissolved air also materially reduces the objectionable odors ordinarily arising from the heated oil.

Because of the very low vapor pressure of these cooking oils within the permissible temperature range, i. e., below their breakdown point of 450° F. to 500° F., it is not feasible to remove the dissolved air by boiling them. However, steam stripping under relatively high vacuum conditions provides an effective method of separating the dissolved air from the oils, and is the preferred mode of deaerating them.

In the accompanying drawings forming a part of this specification there have been illustrated two forms of apparatus constructed and arranged in accordance with the invention and suitable for carrying out the method above outlined. In the said drawings, in which like reference characters designate like parts throughout the views:

Figure 1 is a diagrammatic ivew illustrating apparatus arranged in accordance with the invention, wherein heating of the cooking medium and stripping of the dissolved air therefrom are effected serially;

Fig. 2 is an enlarged vertical sectional view, partly in elevation, of the stripping unit shown in Fig. 1;

Fig. 3 is a cross sectional view of the said unit, on the plane indicated by the line 3—3 in Fig. 2, looking down;

Fig. 4 is a diagrammatic view illustrating a form of installation in which the heating and deaeration of the cooking oil are accomplished simultaneously; and Fig. 5 is an enlarged vertical sectional view, partly in elevation, of the combined heat exchanger and deaerator shown in Fig. 4.

Referring first to Figs. 1, 2 and 3, the installation diagrammatically shown in Fig. 1 comprises an elongated cooking tank or kettle 11, a heat exchanger 12, a liquid heater 13 and a stripping or deaerating unit 14. The specific constructions of the said kettle 11, heat exchanger 12 and heater 13 are immaterial so far as the invention is concerned, although the heater preferably is of the tubular or coil types whereby relatively high thermal efficiency may be attained. It may be fired by fluid fuel supplied through a pipe 15, and in it there is heated a heat-transfer medium, such for example as a well known chlorinated bi-phenyl product readily commercially available under the trade name "Aroclor." This liquid is conducted to the primary side of the heat exchanger 12 by a pipe 16 and returned to the heater through a pipe 17, which preferably includes a pump 18 whereby a continuous flow of the liquid may be maintained in the circuit.

The kettle 11 contains a body of the vegetable oil or other cooking medium mentioned above, which medium may be withdrawn from the discharge end of the kettle and circulated through a pipe 20, the secondary side of the heat exchanger 12, a pipe 21, the deaerator unit 14, a pipe 22, a pump 23, a pipe 24, a valve 25 and a pipe 26 back to the intake end of the kettle, thus maintaining a continuous flow of hot oil through the kettle. As will appear more fully below, the deaerator preferably operates under a high vacuum, and the arrangement of apparatus shown in Fig. 1 is adapted for installations wherein the heat exchanger 12 and/or deaerator 14 are located not more than 34 feet above the kettle 11 whereby the vacuum in the deaerator may induce the flow of oil from the kettle to the heat exchanger and deaerator. In such arrangement the pump 23 is necessary in the return line 22, 24 in order to overcome the vacuum effect in the deaerator and insure return of the oil to the kettle.

The valve 25 is operable, through appropriate connections 27, by a conventional thermostatic control device 28 which is responsive to changes in the temperature of the body of oil in the kettle 11, whereby all, some or none of the heated and deaerated oil returning through the pipes 22 and 24 may be by-passed around the kettle through a pipe 29, as may be necessary to maintain a substantially uniform temperature in the kettle. In addition thereto and to the same end, some or all of the cooking liquid flowing in the pipe 20 may be by-passed around the heat exchanger 12 through a pipe 30 communicating with the pipe 21 through a valve 31 which is also controlled by the thermostatic device 28 through connections 32; and through connections 33 the said device may further control a valve 34 in the fuel supply line 15 of the heater 13.

As best shown in Figs. 2 and 3, the stripping or deaerating unit 14 comprises a closed receptacle 35, in the medial portion of which is mounted a series of perforated plates 36 extending transversely of the receptacle in vertically spaced relation. A segment of each of these plates is cut away or omitted, whereby they do not extend completely across the receptacle and they are arranged with the cut-away portions staggered or alternating as shown in Fig. 2 to provide a tortuous passage extending between the upper and lower portions of the receptacle. The free edge portion of each plate along its cut-away is turned up or otherwise provided with an upwardly extending flange 37. The pipe 21 leading from the heat exchanger 12 enters the receptacle 35 above the series of plates therein, and is provided with a down-turned end 38 discharging onto the uppermost plate 36. An outlet pipe 39 leads from the bottom of the receptacle and is connected to the oil return pipe 22.

Steam from any suitable source is introduced into the stripping unit by means of a pipe 40 discharging beneath the lowest plate 36, and after pursuing the zigzag path between and around the several plates indicated by the arrows in Fig. 2, escapes from the top of the receptacle through a pipe 41, along with the air it has stripped from the cooking oil. Under normal operating conditions the oil is discharged by the pipe 21 to the top plate 36 faster than it can trickle through the perforations in such plate with the result that, because of the flange 37 extending along the free edge of the plate, a pool of oil is established on the plate, as indicated at 42. Oil from this pool spills over the said flange in a cascade or sheet 43 and together with that passing through the plate perforations in drops or fine streams, establishes a similar pool on the next lower plate; and this is continued throughout the series of plates. Thus, in traveling from the inlet pipe 40 to the outlet pipe 41 the steam must pass through not only the several oil showers provided by the perforations in the plates 36 but also through the several sheets of oil cascading over the flanges 37 of the plates, with the result that a very effective separation of the dissolved air from the oil is obtained. There is almost no pressure drop between the bottom of the receptacle and the top thereof and therefore change in the specific volume of the steam is small.

For regulating the feed of oil to the stripping unit a conventional float control device 45 may be provided adjacent and communicating with the lower portion of the receptacle 35, which device through connections 46 actuates a valve 47 in the line 21 whereby to vary discharge of oil from the said line in accordance with rise and fall of the level of the oil pool 48 at the bottom of the receptacle.

The pipe 41 leading from the top of the stripping unit discharges into a conventional separator 50 in which any of the oil which may have become entrained in the steam is separated therefrom and returned to the stripper through a pipe 51. From the separator a pipe 52 conducts the steam to a condenser 53, which may be supplied with cooling water by a pipe 54, and from which the condensate is withdrawn through a pipe 55 by a pump 56, which either returns it to the steam generator or otherwise disposes of it. A vacuum pump, preferably comprising a steam jet 57, is connected to the condenser 53 by a pipe 58 and maintains a vacuum, preferably on the order of 2 inches of mercury absolute, in said condenser, the separator 50 and the receptacle 35, which high vacuum is of material importance in securing substantially complete deaeration of the oil by the steam.

In the arrangement of apparatus shown in Fig. 4 the cooking kettle 11 and liquid heater 13 are present as in the preceding form, but the heat exchanger and the stripper are combined in a single unit 60 whereby heating and deaeration of the cooking liquid may be accomplished simultaneously. The piping 16 and 17, and pump 18, for the heat-transfer liquid, as well as the oil lines 20, 22, 26 and 29, by-pass valve 25, condenser 53, pipes 54, 55 and 58, and jet vacuum pump 57, are also present and function in essentially the same manner as described above in connection with Fig. 1.

This arrangement furthermore is adapted for use in cases where the heat exchange and deaerator unit 60 is located more than 34 feet above the kettle 11. In such cases the vacuum in said unit will be ineffective to elevate the oil thereto from the kettle and therefore a pump 23' is included in the pipe line 20 whereby to transfer the oil from the discharge end of the kettle to the unit 60. On the other hand, if the line 22 be more than 34 feet in length it will provide a barometric leg which will overcome the vacuum in said unit and return the oil therefrom to the kettle, thereby eliminating the necessity for the pump 23 on the intake side of the kettle.

The construction of the combined heat exchanger and deaerator 60 is shown in Fig. 5. The pipes 16 and 17 of the heat-transfer liquid circuit are connected to the respective ends of a pipe coil 61 disposed in the lower portion of a closed cylindrical receptacle 62, and the pipe 20 discharges the cooking oil withdrawn from the kettle 11 by the pump 23' just above said coil. The heated and deaerated oil leaves the receptacle through a goose-neck pipe 63 extending from the bottom thereof and connected to the pipe 22 that returns the oil to the kettle 11. The upper bend of the goose-neck is disposed in approximately the plane of the top of the coil 61 thereby insuring that the oil level 64 in the receptacle does not fall below the top of the coil.

A steam pipe 65 enters the upper portion of the receptacle 62 and extends downwardly axially of the coil 61 to below the lower end thereof, where it communicates with a chamber 66 having a perforated wall 67 through which the steam may escape and bubble up through the body of cooking oil to strip the dissolved air therefrom. The steam and air are drawn off from the top of the receptacle through a pipe 52', having a baffle 68 associated with its intake end and leading to the condenser 53. The jet 57, through pipe 58, condenser 53 and pipe 52', maintains a high vacuum in the stripping receptacle 62, as in the preceding form of the apparatus. If the pipe 55 be more than 34 feet in length it also will provide a barometric leg which will withdraw the condensate from the condenser 53 and the pump 56 of the preceding form may be omitted.

Steam for use in the stripping unit 60, as well as for the jet 57, may conveniently be supplied by a steam generator 70 surrounding and deriving its heat from the heat-transfer liquid return pipe 17, as shown in Fig. 4. The water for said generator may be supplied thereto through a supply line 71 and pump 72.

It will be obvious to those skilled in the art that the details of the procedure constituting the method, as well as the structural details of the apparatus, as herein described and shown, may be varied without departing from the spirit of the invention and therefore it is not wished to be limited to the above disclosure except as may be required by the appended claims.

What is claimed is:

1. In the deep-fat cooking of comestibles, the steps which comprise subjecting the raw comestibles to the cooking action of a body of heated liquid which is open to the atmosphere whereby at the cooking temperatures said liquid dissolves substantial quantities of air; substantially continuously withdrawing liquid from said body, heating it, and returning it to the body; and removing the dissolved air from the withdrawn liquid prior to its return to the body, whereby the dissolved-oxygen content of the liquid in the body is kept relatively low.

2. In the deep-fat cooking of comestibles, the steps which comprise subjecting the raw comestibles to the cooking action of a body of heated liquid which is open to the atmosphere whereby at the cooking temperatures said liquid dissolves substantial quantities of air; and substantially continuously withdrawing liquid from said body, sequentially heating and deaerating it, and then returning it to the body.

3. In the deep-fat cooking of comestibles, the steps which comprise subjecting the raw comestibles to the cooking action of a body of heated liquid which is open to the atmosphere whereby at the cooking temperatures said liquid dissolves substantial quantities of air; and substantially continuously withdrawing liquid from said body, simultaneously heating and deaerating it, and then returning it to the body.

4. In the preparation of deep-fat cooked comestibles, the steps which comprise continuously traversing raw comestibles through a body of heated cooking liquid which is open to the atmosphere whereby at the cooking temperatures such liquid dissolves substantial quantities of air; substantially continuously withdrawing liquid from said body, and heating it; passing steam through the withdrawn liquid to strip the dissolved air therefrom; and returning the heated and deaerated liquid to the body.

5. In the preparation of deep-fat cooked comestibles, the steps which comprise continuously traversing raw comestibles through a body of heated cooking liquid which is open to the atmosphere whereby at the cooking temperatures such liquid dissolves substantial quantities of air; substantially continuously withdrawing liquid from said body and heating it; passing steam through the withdrawn liquid while subjecting it to high vacuum to strip the dissolved air from the liquid; and returning the heated and deaerated liquid to the body.

6. In the preparation of deep-fat cooked comestibles, the steps which comprise traversing raw comestibles through a body of heated cooking liquid which is open to the atmosphere whereby at the cooking temperatures such liquid dissolves substantial quantities of air; substantially continuously withdrawing liquid from said body and heating it; continuously finely dividing the heated liquid and passing steam therethrough to strip the dissolved air from such liquid; and returning the heated and deaerated liquid to the body.

7. In the preparation of deep-fat cooked comestibles, the steps which comprise traversing raw comestibles through a body of heated cooking liquid which is open to the atmosphere whereby at the cooking temperatures such liquid dissolves substantial quantities of air; substantially continuously withdrawing liquid from said body and heating it; continuously finely dividing the heated liquid and passing steam therethrough while subjecting it to a high vacuum, to strip the dissolved air from such liquid; and returning the heated and deaerated liquid to the body.

8. In the preparation of deep-fat cooked comestibles, the steps which comprise traversing raw comestibles through a body of heated cooking liquid which is open to the atmosphere whereby at the cooking temperatures such liquid dissolves substantial quantities of air; substantially continuously withdrawing liquid from said body; continuously heating the withdrawn liquid and simultaneously therewith passing steam through it to strip the dissolved air therefrom; and returning the heated and deaerated liquid to the body.

9. In the preparation of deep-fat cooked comestibles, the steps which comprise traversing raw comestibles through a body of heated cooking liquid which is open to the atmosphere whereby at the cooking temperatures such liquid dissolves substantial quantities of air; substantially continuously withdrawing liquid from said body; continuously heating the withdrawn liquid and simultaneously therewith passing steam through it and subjecting it to a high vacuum, to strip the dissolved air from the liquid; and returning the heated and deaerated liquid to the body.

References Cited in the file of this patent

UNITED STATES PATENTS

| Number | Name | Date |
|---|---|---|
| 1,234,131 | Cleveland | July 24, 1917 |
| 1,800,724 | Elliot | Apr. 14, 1931 |
| 1,895,983 | Emanueli | Jan. 31, 1933 |
| 1,927,786 | Hunter | Sept. 19, 1933 |
| 2,207,316 | Ferry | July 9, 1940 |
| 2,286,644 | Pringle et al. | June 16, 1942 |
| 2,539,549 | Rayburn | Jan. 30, 1951 |
| 2,611,705 | Hendel | Sept. 23, 1952 |
| 2,639,779 | Glanzer | May 26, 1953 |
| 2,642,949 | Tyskewicz | June 23, 1953 |